US008259342B2

(12) United States Patent
Kamijoh et al.

(10) Patent No.: US 8,259,342 B2
(45) Date of Patent: Sep. 4, 2012

(54) SYSTEM, METHOD AND PROGRAM FOR GENERATING DATA FOR PRINTING INVISIBLE INFORMATION, AND METHOD OF MANUFACTURING PHYSICAL MEDIUM WHEREUPON INVISIBLE INFORMATION IS PRINTED

(75) Inventors: Kohichi Kamijoh, Kanagawa-ken (JP); Noboru Kamijo, Kanagawa-ken (JP); Kazumasa Ochiai, Kanagawa-ken (JP); Yasuo Usuba, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 11/993,975

(22) PCT Filed: Jun. 30, 2006

(86) PCT No.: PCT/JP2006/313058
§ 371 (c)(1),
(2), (4) Date: Dec. 27, 2007

(87) PCT Pub. No.: WO2007/004534
PCT Pub. Date: Jan. 11, 2007

(65) Prior Publication Data
US 2009/0124195 A1 May 14, 2009

(30) Foreign Application Priority Data
Jul. 4, 2005 (JP) .................................. 2005-195338

(51) Int. Cl.
*G06F 15/00* (2006.01)
*G06F 1/00* (2006.01)
*G06K 15/00* (2006.01)
*H04N 1/40* (2006.01)

(52) U.S. Cl. ...................................... 358/1.18; 358/3.28

(58) Field of Classification Search .................. 358/1.18, 358/1.15, 1.13, 1.14, 1.1, 3.27, 3.28
See application file for complete search history.

(56) References Cited

U.S. PATENT DOCUMENTS
4,392,053 A 7/1983 Bockholt
(Continued)

FOREIGN PATENT DOCUMENTS
CN 1314652 9/2001
(Continued)

OTHER PUBLICATIONS
Office Action (Mail Date Sep. 26, 2008) on U.S. Appl. No. 11/611,733; Filing Date Dec. 15, 2006; Confirmation No. 4857.
(Continued)

*Primary Examiner* — Douglas Tran
(74) *Attorney, Agent, or Firm* — Schmeiser, Olsen & Watts; John Pivnichny

(57) ABSTRACT

A method of manufacturing a physical medium configured to store data. A layout design of visible and invisible information to be printed in a book with visible and invisible ink, respectively, is generated. The visible information includes an article. The invisible information includes a URL of an address of a web server at which additional information associated with the article is located. Print data of the visible and invisible information based on the generated layout design of the visible and invisible information are generated. The generated print data of the visible and invisible information are stored on the physical medium. A book containing the article in visible ink and the invisible information in invisible ink is produced. A cellular phone is used to obtain the additional information by identifying the URL via illuminating and photographing the invisible information in the book using a light-emitting element in the cellular phone.

19 Claims, 12 Drawing Sheets

U.S. PATENT DOCUMENTS

| | | | |
|---|---|---|---|
| 5,259,907 | A | 11/1993 | Soules et al. |
| 5,502,304 | A | 3/1996 | Berson et al. |
| 5,996,893 | A | 12/1999 | Soscia |
| 6,572,025 | B1 | 6/2003 | Nishikado et al. |
| 6,644,764 | B2 | 11/2003 | Stephens, Jr. |
| 6,655,579 | B1 | 12/2003 | Delman et al. |
| 6,788,293 | B1 | 9/2004 | Silverbrook et al. |
| 7,305,105 | B2 * | 12/2007 | Chosson et al. ............... 382/100 |
| 7,498,075 | B2 | 3/2009 | Bloomberg et al. |
| 7,520,443 | B2 | 4/2009 | Kamijoh et al. |
| 7,667,217 | B2 | 2/2010 | Kamijoh et al. |
| 2002/0030842 | A1 * | 3/2002 | Iida ............................... 358/1.14 |
| 2002/0163579 | A1 * | 11/2002 | Patel et al. ................. 348/207.1 |
| 2003/0071270 | A1 * | 4/2003 | Fuwausa et al. ................ 257/98 |
| 2004/0041030 | A1 | 3/2004 | Nimura et al. |
| 2005/0011766 | A1 | 1/2005 | Tojo et al. |
| 2005/0190894 | A1 * | 9/2005 | Fukunaga et al. ......... 379/88.13 |
| 2006/0072779 | A1 | 4/2006 | Erol |
| 2007/0138286 | A1 * | 6/2007 | Kamijoh et al. ......... 235/462.04 |
| 2007/0267500 | A1 | 11/2007 | Juds |
| 2008/0151280 | A1 | 6/2008 | Kamijo et al. |
| 2009/0016568 | A1 | 1/2009 | Kamijoh et al. |
| 2009/0050700 | A1 | 2/2009 | Kamijoh et al. |

FOREIGN PATENT DOCUMENTS

| | | |
|---|---|---|
| JP | 02-072357 | 3/1990 |
| JP | 11066273 | 3/1999 |
| JP | 11-279474 | 10/1999 |
| JP | 11-286149 | 10/1999 |
| JP | 2000209426 | 7/2000 |
| JP | 2001188870 | 7/2001 |
| JP | 2002098505 | 4/2002 |
| JP | 2002133194 | 5/2002 |
| JP | 2002165078 | 6/2002 |
| JP | 2003058824 | 2/2003 |
| JP | 2003162207 | 6/2003 |
| JP | 2003168068 A | 6/2003 |
| JP | 2003-296659 | 10/2003 |
| JP | 2004-054510 | 2/2004 |
| JP | 2004-078263 | 3/2004 |
| JP | 2005151124 | 6/2005 |
| JP | 2005195338 | 7/2005 |
| JP | 2005309717 | 11/2005 |
| JP | 2005316977 | 11/2005 |
| JP | 2005318200 | 11/2005 |
| JP | 2005318201 | 11/2005 |
| JP | 2006229894 | 8/2006 |
| WO | 9513597 | 5/1995 |
| WO | 2005069216 | 7/2005 |
| WO | WO2007/004534 A1 | 1/2007 |
| WO | 2008075748 | 6/2008 |

OTHER PUBLICATIONS

Response (filed Oct. 28, 2008) to Office Action (Mail Date Sep. 26, 2008) on U.S. Appl. No. 11/611,733; Filing Date Dec. 15, 2006; Confirmation No. 4857.

Notice of Allowance (Mail Date Dec. 3, 2008) on U.S. Appl. No. 11/611,733; Filing Date Dec. 15, 2006; Confirmation No. 4857.

Office Action (Mail Date Sep. 20, 2010) on U.S. Appl. No. 11/963,635; Filing Date Dec. 21, 2007; Confirmation No. 1377.

Response (Filed Dec. 20, 2010) to Office Action (Mail Date Sep. 20, 2010) on U.S. Appl. No. 11/963,635; Filing Date Dec. 21, 2007; Confirmation No. 1377.

Notice of Allowance (Mail Date Mar. 2, 2011) on U.S. Appl. No. 11/963,635; Filing Date Dec. 21, 2007; Confirmation No. 1377.

Request for Continued Examination (Filed May 24, 2011) on U.S. Appl. No. 11/963,635; Filing Date Dec. 21, 2007; Confirmation No. 1377.

Notice of Allowance (Mail Date Jun. 10, 2011) on U.S. Appl. No. 11/963,635; Filing Date Dec. 21, 2007; Confirmation No. 1377.

Office Action (Mail Date Feb. 19, 2010) on U.S. Appl. No. 11/845,080; Filing Date Aug. 26, 2007; Confirmation No. 8129.

Notice of Allowance (Mail Date Oct. 8, 2009) on U.S. Appl. No. 12/166,107; Filing Date Jul. 1, 2008; Confirmation No. 3085.

Kamijoh et al., "Electrical Scrap System," DICOMO2005 Symposium paper, Jul. 6, 2005.

* cited by examiner

SYSTEM, METHOD AND PROGRAM FOR GENERATING DATA FOR PRINTING INVISIBLE INFORMATION, AND METHOD OF MANUFACTURING PHYSICAL MEDIUM WHEREUPON INVISIBLE INFORMATION IS PRINTED

TECHNICAL FIELD

The present invention generally relates to an information processing technique. More particularly, the present invention relates to a technique for generating print data of invisible information to be printed on a physical medium, and a technique for manufacturing the physical medium on which the invisible information is printed.

BACKGROUND ART

There are ink compositions which are colorless and invisible under ordinary visible light but emit light and become visible in response to illumination of light at a specific wavelength such as ultraviolet light. In general, such an ink composition is called invisible ink. As a specific example of invisible ink, Japanese Patent Application Laid-Open No. 11-279474 (Patent Document 1) discloses an ink composition (see a chemical formula in FIG. 18) containing a fluorescent compound of arylsulfonic acid and tertiary amine.

An application of invisible ink is disclosed in Japanese Patent Application Laid-Open No. 2003-296659 (Patent Document 2) as a method of downloading information from a server on a network using a QR code as a kind of two-dimensional bar code written in invisible ink. According to an embodiment described in Japanese Patent Application Laid-Open No. 2003-296659, a publisher prints a QR code in an invisible ink (transparent material) absorbing infrared rays to overlap an article printed in visible black ink on a magazine. Then, a reader of the magazine uses a camera-equipped cellular phone to which infrared rays are emitted to recognize the QR code so as to extract a URL from the recognized QR code. Based on the extracted URL, the reader downloads information from a publisher's server.

[Patent Document 1] Japanese Patent Application Laid-Open No. 11-279474
[Patent Document 2] Japanese Patent Application Laid-Open No. 2003-296659

DISCLOSURE OF THE INVENTION

Problems to be Solved by the Invention

Upon recognizing and extracting invisible information taken with a digital camera and printed in invisible ink, it can be difficult to recognize invisible information depending on the state of visible information printed in a superimposed manner. Even if the visible information does not interfere with the recognition of the invisible information, the extraction accuracy of the information could be degraded depending on the condition of a print medium (such as the quality of paper or stain on paper). Further, the state of browsing the print medium (such as a folded state of paper or the brightness of a location where to view the print medium) could also degrade the extraction accuracy. Thus, depending on the print state and/or the browsing state, there are cases where sufficient extraction accuracy of the invisible information cannot be obtained.

In such cases, it is necessary to optimize print data of invisible information. However, on the existing technical conditions, there are no ways of obtaining print data of automatically optimized invisible information and using such print data to print invisible information on a physical medium on which visible information is to be printed.

The present invention has been made to solve the above problems, and it is an object to provide a system, method, and a program for generating data for use in printing invisible information, and a method of manufacturing a physical medium whereupon invisible information is printed.

Means for Solving the Problems

In order to solve the problems, a system for generating print data of invisible information to be printed on a physical medium such as paper, plastic, or cloth is provided. The invisible information is printed on the medium, on which visible information is printed, and extracted using an apparatus having a shooting function. The system comprises: means for storing layout data of visible information to be printed on the physical medium; means for storing layout data of invisible information; means for calculating extraction accuracy of the invisible information using the layout data of the visible information and the layout data of the invisible information; means for determining whether the extraction accuracy of the invisible information meets a predetermined condition; and means for generating data for printing the invisible information from the layout data of the invisible information if the extraction accuracy meets the predetermined condition.

Preferably, the calculating means calculates the extraction accuracy of the invisible information based on characteristic data of ink to be used for printing the visible information, characteristic data of ink to be used for printing the invisible information, characteristic data of the physical medium, and/or predicted data of extraction environment of the apparatus provided with the shooting function. For example, if the physical medium is paper, the characteristic data of the physical medium can include information on the quality of paper, stain on paper, etc. The predicted data of the extraction environment can include information such as, for example, the performance of a light-emitting element for making the invisible information visible, a light-emitting intensity, a shooting distance, a shooting angle, the brightness upon shooting, etc.

The system can also comprise means for generating corrected layout data of the invisible information when the extraction accuracy does not meet the predetermined condition. The calculating means and the determining means can process the corrected layout data of the invisible information.

Preferably, the system further comprises means for sending a feedback related to the layout data to the means for generating the corrected layout data of the invisible information when the extraction accuracy does not meet the predetermined condition. In this case, it is preferable to provide means for optimizing the layout data of the invisible information based on the feedback in order to generate the corrected layout data of the invisible information.

Preferably, the layout data includes an image pattern representing all or part of the invisible information. The image pattern can be a two-dimensional bar code representing the invisible information. Further, the optimizing means can change the arrangement of the layout data, deform all or part of the image pattern, change the size of all or part of the image pattern, increase or decrease the number of image patterns, and/or increase the ability to correct an error in the image pattern.

The system can further be provided with a printer for printing the invisible information based on data for printing the invisible information.

The system can be further provided with a server including means for storing information related to the visible information in association with a specific address location, means for receiving a request including information representing the specific address location from an apparatus for extracting invisible information, and means for sending the information related to the visible information to the apparatus for extracting the invisible information in response to the request.

The system can further be provided with an apparatus including means for uploading the information related to the visible information to the server, means for sending the visible information, and means for sending the specific address location associated with the visible information uploaded to the server.

As described above, the present invention has been described as a system for generating print data of invisible information, the present invention can also be understood as a method, a program, or a program product. The program product can, for example, include a storage medium on which the above-mentioned program is stored, or a medium for transmitting the program.

The present invention can further be understood as a method of manufacturing a physical medium on which invisible information to be extracted by an apparatus provided with visible information and shooting function is printed. The method of manufacturing such a physical medium comprising: a step of storing layout data of the visible information; a step of generating data for printing the visible information from the layout data of the visible information; a step of storing layout data of the invisible information; a step of calculating extraction accuracy of the invisible information using the layout data of the visible information and the layout data of the invisible information; a step of determining whether the extraction accuracy of the invisible information meets a predetermined condition; a step of generating data for printing the invisible information from the layout data of the invisible information if the extraction accuracy meets the predetermined condition; a step of printing the visible information on the physical medium based on the data for printing the visible information; and a step of printing the invisible information on the physical medium based on the data for printing the invisible information.

It should be noted that the above-mentioned overview of the invention does not cite all of necessary features of the present invention, and a combination or a subcombination of these configuration elements can also be considered the invention.

Advantages of the Invention

According to the present invention, print data capable of improving the extraction accuracy of invisible information to be printed on a physical medium together with visible information can be generated. Further, according to the present invention, the physical medium on which the invisible information is printed using such print data can be manufactured.

BEST MODE FOR CARRYING OUT THE INVENTION

Although the best mode for carrying out the present invention will be described based on the accompanying drawings, the following embodiment does not limit the invention according to the scope of claims for patent, and all of combinations of features described in the embodiment are not necessarily required as means for solving the problems according to the invention.

Further, the present invention can be embodied in many different modes, and interpretation of the invention should not be limited to the description contents of the embodiment. It should also be noted that means for solving the problems according to the invention does not require all combinations of features described in the embodiment. Throughout the description of the embodiment, the same components are given the same reference numerals.

FIG. 1 is a high level conceptual diagram of the embodiment of the present invention. The embodiment of the present invention includes an in-house system 10 of a publisher for publishing a book, a system 20 of a printing company for printing the book, and a cellular phone 30 of a reader who purchases the book. Note that the medium on which invisible information is printed is paper in the embodiment of the present invention, but the medium is not limited thereto. For example, the present invention can, of course, be applied to such a case where invisible information is printed on different physical media such as a plastic product like a credit card and a cloth product like clothes.

The in-house system 10 of the publisher according to the embodiment of the present invention includes an author's computer 11 and an editor's computer 12 communicable with each other through an intranet 14, and a web server 13 for publishing publisher's information. In the embodiment of the present invention, the intranet 14 connects the computers using TCP/IP (Transmission Control Protocol/Internet Protocol). In the intranet 14, computers to communicate with each other using IP addresses represented as global addresses or local addresses are identified.

The author's computer 11 has a function for enabling the author to create an article draft to be inserted in the book and additional information related to the article. In the embodiment of the present invention, an ordinary word processing software such as LOTUS WORD PRO® offered by International Business Machines, Microsoft Word® offered by Microsoft Corporation, or Ichitaro® offered by Just System, is installed in the author's computer 11.

The author can transmit the created article draft from the author's computer 11 to the editor's computer 12 through the intranet 14. Further, the author can upload additional information of the created article from the author's computer 11 to the web server 13 so that the reader can access the additional information. In the embodiment of the present invention, it is preferable that the address location of the uploaded additional information (URL (Uniform Resource Locator) on the Internet in the embodiment of the present invention) be transmitted from the author's computer 11 to the editor's computer 12 together with the created article draft in order to print it in the book as invisible information.

The editor's computer 12 has a function for creating print data necessary for editing and/or layout of the article and the like received from the author's computer 11 in order to produce the book. Note here that the editor's computer 12 has a function for generating print data of invisible information to be printed in invisible ink in the book in addition to the article printed in visible ink in the book. The invisible information can be represented by figures such as characters, but in the embodiment of the present invention, the invisible information is represented by a two-dimensional bar code (so-called QR code).

In the embodiment of the present invention, the invisible information contains a URL as additional information received and uploaded from the author's computer 11 together with the created article draft, but the present invention is not limited thereto. In other words, information as invisible information other than the URL can be received from another computer or the editor can create the information. The editor's computer 12 can be implemented by installing DTP (Desktop Publishing) software having additional functions. In the embodiment of the present invention, the created print data is recorded on a CD-R as a common recording medium, and delivered to the printing company. However, it is understood by those skilled in the art that the publisher can use any other recording media, or send the print data to the printing company through a network.

The web server 13 has a function for storing data, uploaded from a computer connected to the intranet 14 such as the author's computer 11 or the editor's computer 12, in a predetermined format in association with a specific address location. The web server 13 also has a function for providing the stored data to the reader or the like in response to a request from the reader or the like via the Internet 40.

The system 20 of the printing company in the embodiment of the present invention includes a computer 21 and a printer 22 connected to each other in the printing company. The computer 21 of the printing company has functions for reading data from the recording medium storing the print data (the CD-R with the print data stored thereon in the embodiment of the present invention) and storing it in a built-in recording unit. The computer 21 of the printing company also has a function for having the printer 22 print a book 23 based on the print data stored in the built-in recording unit.

The printer 22 has a function for producing the book 23 using various visible inks such as black ink and/or color inks. Although the printer 22 can, of course, be a consumer-type small printer, it is preferable that the printer 22 be a large offset printer or the like because the embodiment of the present invention assumes mass production of the books 23. It is to be noted that the printer 22 also has a function for printing invisible information 24 using invisible ink. It should be noted that those skilled in the art can appropriately design the function for printing the invisible information in such a manner to add the function to any conventional printer 22.

FIGS. 8 and 9 show image examples of a page of the book 23 produced on the printer 22 according to the embodiment of the present invention. FIG. 8 shows an image of the page as viewed under normal visible light. In this case, the reader can view only the normal article, i.e., the reader can browse the article normally.

In the embodiment of the present invention, if the reader illuminates the page with light of a special wavelength, the invisible information 24 appears as shown in FIG. 9. In the embodiment of the present invention, the invisible information 24 is a QR code as a kind of two-dimensional bar code illustrated in FIG. 10. A specification of the QR code is standardized as ISO (ISO/IEC 18004) or JIS (JIS-X-0510). Since the information can easily be obtained, its detailed description will be omitted here. In the embodiment of the present invention, the reader of the book 23 reads the QR code using a camera-equipped cellular phone 30 provided with a light-emitting element 607 emitting light of the special wavelength and decodes the QR code using a processing function of the cellular phone to enable the reader to acquire the invisible information.

The cellular phone 30 of the reader in the embodiment of the present invention has a function as the digital camera function and a function for accessing the Internet 40 via a base station 41. Further, the cellular phone 30 has a function for allowing the reader who subscribes to the book 23 to use the digital camera function of the cellular phone 30 to decode the two-dimensional bar code 24 as the read invisible information. The reader can access the additional information stored in the web server 13 using the function for accessing the Internet 40 via the base station 41 based on the URL for the additional information associated with the article of the book contained in the invisible information.

In the embodiment of the present invention, a PDC (Personal Digital Cellular) system can, for example, be employed as a wireless communication system between the cellular phone 30 of the reader and the base station 41, but the present invention is not limited thereto. For example, any other system such as a CDMA (Code Division Multiple Access) system can be employed appropriately.

In the embodiment of the present invention, the computers can be connected over the Internet 40 using TCP/IP like through the intranet 14. Like in the intranet 14, computers to communicate with each other are identified in the Internet 40 using IP addresses represented by global addresses or local addresses.

FIG. 2 is an outline view showing an example of an information processing apparatus 200 suitable for implementation of the author's computer 11, the editor's computer 12, the web server 13, or the computer 21 of the printing company according to the embodiment of the present invention. The information processing apparatus 200 includes a main body 201, a keyboard 306, a mouse 307, and a display device 311. A use of the information processing apparatus 200 can operate the keyboard 306 and the mouse 307 to do desired work such as creation and editing of a document or printer control. The user can also view the visually displayed information on the display device 311 to check the working condition on an as-needed basis.

FIG. 3 is a diagram showing an exemplary hardware configuration of the information processing apparatus 200 suitable for implementation of the author's computer 11, the editor's computer 12, the web server 13, or the computer 21 of the printing company according to the embodiment of the present invention. The information processing apparatus 200 includes a CPU (Central Processing Unit) 301 and a main memory 303 connected to a bus 302. Further, removable storages (external storage systems capable of replacing recording media) such as hard disk drives 313 and 330, CD-ROM drives 326 and 329, a flexible disk drive 320, an MO drive 328, and a DVD-ROM drive 331 are connected to the bus 302 via an IDE controller 325 and a SCSI controller 327.

Then, a flexible disk, such as an MO, a CD-ROM, or a DVD-ROM is inserted into a corresponding removable storage. Computer program codes can be recorded on these storage media, the hard disk drives 313 and 330, and a ROM 314 to cooperate with the an operating system to give instructions to the CPU and the like so as to execute the present invention. The computer program is executed by loading it to the main memory 304. The computer program can also be compressed or divided and stored in a plurality of media.

The information processing apparatus receives input from user interface devices such as the keyboard 306 and mouse 307 via a keyboard/mouse controller 305. The information processing apparatus 200 is connected to the display device 311 via a DAC/LCDC 310 to provide visual data to the user.

The information processing apparatus is connected to a network through a network adapter 318 (such as an Ethernet® card or a token ring card) so that it can communicate with other computers and the like. Though not shown, the information processing apparatus 200 can be connected to a printer through a parallel port or to a modem through a serial port.

As described above, it will be easily understood that the information processing apparatus 200 suitable for implementation of the author's computer 11, the editor's computer 12, the web server 13, or the computer 21 of the printing company according to the embodiment of the present invention can be an information processing apparatus such as a mainframe computer, a workstation, or a normal personal computer, or a combination of these computers. Note that these configuration elements are just illustrative examples and the invention does not enumerate all of necessary features of the present invention.

Of course, it can be easily understood by those skilled in the art that various changes are possible, such as to implement each of the hardware configuration elements of the information processing apparatus 200 used in the embodiment of the present invention by means of a plurality of machines to distribute and execute each function. These changes should be included within the scope of the present invention.

The information processing apparatus 200 can employ an operating system supporting a GUI (Graphical User Interface) multi-window environment, such as a Windows® operating system offered by Microsoft Corporation, an AIX® offered by International Business Machines Corporation, a Mac OS® offered by Apple Computer Incorporated, or Linux®.

The information processing apparatus can also employ an operating system supporting a character-based environment, such as PC-DOS offered by International Business Machines Corporation or MS-DOS offered by Microsoft Corporation. Further, the information processing apparatus 200 can also employ a real-time OS as the operating system such as OS Open offered by International Business Machines Corporation and an operating system to be built in a network computer such as Java® OS.

As mentioned above, it can be understood that the information processing apparatus 200 used in the embodiment of the present invention is not limited to a specific operating system environment.

FIG. 4 is a functional block diagram of the editor's computer 12 according to the embodiment of the present invention. Note that each element shown in the functional block diagram of FIG. 4 and the like can be so implemented that the hardware resources cooperate with software by loading the computer program stored in the hard disk drive 313 to the main memory 304 and causing the CPU 301 to read the computer program in the information processing apparatus 200 having the hardware configuration illustrated in FIG. 3.

The editor's computer 12 includes a visible information storage section 401, an invisible information storage section 402, a printing characteristic data storage section 403, an extraction environment data storage section 404, a visible information layout generating section 405, an invisible information layout generating section 406, an extraction accuracy calculating section 407, an extraction result determining section 408, a feedback section 409, and a print data generating section 410. The editor's computer 12 also includes an input section 411, a display section 412, and a network interface 413 as its interface with a user or an external computer.

The visible information storage section 401 stores, in a digital format, information to be printed in visible ink on the physical medium for the book including the article draft crated on the author's computer 11. The invisible information storage section 402 stores, in a digital format, invisible information received from other computers including the author's computer 11 through the network interface 413 or invisible information created by the editor. In the embodiment of the present invention, the invisible information includes an URL for the additional information of the article created on the author's computer 11. The printing characteristic data storage section 403 stores, in a digital format, printing characteristics for the book, such as the color of paper or stain on the paper, and information related to ink colors used in printing the visible information and/or invisible information. The extraction environment data storage section 404 stores, in a digital format, an environment in which the reader extracts the invisible information, such as an expected shooting performance of the digital camera, the performance of the light-emitting element emitting light of a special wavelength (e.g., LED characteristics), a shooting distance, a shooting angle, and information related to the brightness upon shooting.

The visible information layout generating section 405 generates layout data of the visible information based on the data stored in the visible information storage section 401. In the embodiment of the present invention, since the layout data of the visible information is generated manually or semi-automatically in response to input from the editor via the input section 411, the detailed description of the operations will be omitted because it is not essential of the present invention. The invisible information layout data generating section 406 generates the layout data of the invisible information based on the data stored in the invisible information storage section 402. In the embodiment of the present invention, it is assumed that the layout data of the invisible information is automatically generated, but the reader can adjust the layout data of the invisible information by operating the input section 411. Note that in the embodiment of the present invention, the layout data of the invisible information includes image data of a QR code as a kind of two-dimensional bar code as an image pattern representing all or part of the invisible information.

The extraction accuracy calculating section 407 simulates the extraction of the invisible information to calculate the extraction accuracy of the invisible information using the layout data of the visible information generated by the visible information layout generating section 405 and the layout data of the invisible information generated by the invisible information layout generating section 406. In the embodiment of the present invention, data stored in the printing characteristic data storage section 403 and the extraction environment data storage section 404 are used for simulation. The extraction result determining section 408 determines whether the extraction accuracy of the invisible information calculated by the extraction accuracy calculating section 407 meets a predetermined condition. If the extraction result determining section 408 determines that the extraction accuracy does not meet the predetermined condition, the invisible information layout generating section 406 generates new layout data of the invisible information to activate the extraction accuracy calculating section 407 and the extraction result determining section 408 for the new layout data of the invisible information.

When the extraction result determining section 408 determines that the extraction accuracy does not meet the predetermined conditions, the feedback section 409 sends the invisible information layout generating section 406 feedback information to be referred to upon generating the new layout data of the invisible information. In the embodiment of the present invention, the invisible information layout generating section 406 optimizes the layout data of the invisible information based on the feedback to create the new layout data of the invisible information. The optimization of the layout data includes, for example, a change in the arrangement of elements contained in the layout data, a deformation of all or part of the QR code, a change in size, an increase or decrease in number, and a change in error correcting capability, but the present invention is not thereto.

When the extraction result determining section 408 determines that the extraction accuracy meets the predetermined condition, the print data generating section 410 generates print data of the invisible information from the layout data of the invisible information. The print data generating section 410 can also generate print data of the visible information from the layout data of the visible information from the visible information layout generating section 405. In the embodiment of the present invention, the visible information and/or print data of invisible information is stored on a CD-R as a recording medium released to the public and easily available, and delivered to the printing company 20.

The input section 411 receives input from the editor to allow the editor to adjust the layout of visible information and/or invisible information. The display section 412 displays the layout of visible information or invisible information currently processed or the calculation or determination result of the extraction accuracy. The editor can operate the input section 411 while referring to information displayed in the display section. The network interface 413 has a function for exchanging information with the intranet 14. The editor's computer 12 receives information such as the article draft from the author's computer 11 via the network interface 413 to store it in the visible information storage section 401 or the like.

FIG. 5 is a functional block diagram of the web server 13 according to the embodiment of the present invention. The web server 13 includes a communication interface 503, an additional information storage section 504, and a web page generating section 505. Those skilled in the art will appreciate that the web server 13 can easily be built by introducing software for building a web server, such as free software Apache or IIS product offered by Microsoft Corporation, into the information processing apparatus having a hardware configuration illustrated in FIG. 3.

The communication interface 503 stores data of additional information uploaded through a routing line 501 from a computer connected to the intranet 14, such as the author's computer 11 or the editor's computer 12, in the additional information storage section 504 in association with the URL for the additional information. The communication interface 503 can also transfer, to the web page generating section 505, a request including a URL for additional information received through a routing line 502 from the cellular phone 30 of the reader. In response to the request received from the cellular phone 30 of the reader via the communication interface 503, the web page generating section 505 can create a web page based on the additional information stored in the additional information storage section 504 and send it back to the cellular phone 30 through the routing line 502.

FIG. 6 is an outline view of the cellular phone 30 of the reader according to the embodiment of the present invention. It is understood from FIG. 6 that the cellular phone 30 includes an antenna 601, a display 603, an input section 604, a camera 606, a light-emitting element 607, a speaker 608, and a microphone 609. From its appearance, there is no difference from conventional cellular phones except that the cellular phone 30 of the reader is provided with the light-emitting element 607 emitting light of a specific wavelength to make the invisible ink visible. The light-emitting element 607 can be a commercially available LED (Light Emitting Diode).

FIG. 7 is a functional block diagram of the cellular phone 30 of the reader according to the embodiment of the present invention. It is understood from FIG. 7 that the cellular phone 30 includes a radio section 602, a memory 605, and a controller 610 in addition to the antenna 601, the display 603, the input section 604, the camera 606, the light-emitting element 607, the speaker 608, and the microphone 609 described in connection with FIG. 6.

The antenna 601 has a function for receiving a radio wave from the base station 41 and sending a radio wave from the radio section 602 to the base station 41. The radio section 602 modulates the radio wave received at the antenna into an electric signal and demodulates an electric signal into a radio wave. The display 603 shows the information to an operator so that the operator will operate the cellular phone using the input section 604 while referring to the displayed information. The memory 605 is used to store information such as an image shot with the camera 606. The camera 606 includes a lens capable of taking a picture. The light-emitting element 607 can emit light of a special wavelength to illuminate the invisible information. The operator can not only hear a voice sound through the speaker 608, but also input his or her voice through the microphone 609. These configuration elements are controlled by the controller 610.

FIG. 11 is a flowchart 1100 showing an outline of a flow of print data creation for a book according to the embodiment of the present invention. The processing starts at step 1101, and in step 1102, the author uses the word processing software installed on the author's computer 11 to create an article draft and additional information associated with the article.

The processing proceeds to step 1103 in which the author's computer 11 sends the article draft to the editor's computer 12. Further, in step 1103, the author's computer 11 uploads additional information to the web server 13.

Next, in step 1104, the article to be printed in visible ink is edited and its layout is designed. In the embodiment of the present invention, it is considered at a stage of designing the layout of invisible information how the layout of the article to be printed in visible ink is designed. Therefore, in the embodiment of the present invention, it is preferable that this step be executed before designing the layout of the invisible information.

Then, the processing proceeds to step 1105 in which the layout of the invisible information is designed. In the embodiment of the present invention, the invisible information is represented by a QR code as a kind of two-dimensional bar code. This processing step will be described in detail later. Next, in step 1106, print data is generated based on the layout of the article and the invisible information defined in steps 1104 and 1105. The generated print data is stored on a recording medium such as a CD-R, and delivered to the printing company. Then, the processing proceeds to step 1107 to end the print data creation processing for the book.

Next, processing performed in the in-house system 20 of the printing company which has received the print data in the embodiment of the present invention will be described with reference to a flowchart 1200 of FIG. 12. The processing starts at step 1201, and in step 1202, the printing company takes delivery of the print data stored on the recording medium, and captures it into the computer 21 of the printing company. Then, the processing proceeds to step 1203, in which the computer 21 is operated to control the printer at the printing company to print the article information in visible ink and the QR code in invisible ink. After that, the printing company binds a book and the like to produce the book. Next, in step 1204, the produced book is shipped and delivered to the reader through the market.

Further, processing for enabling the reader who received the book to get additional information of an article in the book in the embodiment of the present invention will be described with reference to a flowchart of FIG. 13. The processing starts at step 1301, and in step 1302, the reader reads the purchased book. Then, the processing proceeds to step 1303. Suppose in step 1303 that the reader finds an article in the book to which additional information is attached and wants to get the additional information. In such a case, the reader emits the light-emitting element 607 on the cellular phone 30 to illuminate the invisible information and takes a picture of the illuminated information with the camera 606 in the next step 1304 to capture an image of the QR code into the cellular phone 30. Then, in step 1305, the QR code is decoded to acquire the URL for the additional information. Then, the processing proceeds to step 1306 to access the web server 13 using the decoded and acquired URL for the additional information in order to download the additional information in step 1307. The reader can check the downloaded additional information, for example, on the display 603 of the cellular phone 30. After that, the processing proceeds to step 1308 to end the processing.

Next, processing for generating layout data of invisible information as described at step 1105 of FIG. 11 will be described in detail with reference to FIGS. 14 to 16. In the embodiment of the present invention, the printer 22 prints the invisible information on a page of the book as a square QR code as an example. Note here that the shape of the QR code does not need to be a square and the code does not need to be the QR code to implement the present invention.

The processing starts at step 1401, and in step 1402, the minimum and maximum values indicative of the size of the QR code representing the invisible information (hereinafter referred to as "code size") are decided using data stored in the printing characteristic data storage section 403 and the extraction environment data storage section 404. Specifically, the minimum value of the code size is calculated from the number of pixels in the camera, for example. On the other hand, the maximum value of the code size is decided, for example, based on the angle and intensity of the light-emitting element (LED), shooting distance, and brightness upon shooting. It should be noted that those skilled in the art can appropriately design methods for calculating these maximum and minimum values. In the embodiment of the present invention, the code size means a side length (Q in FIG. 17) of the QR code including an auxiliary portion.

Next, in step 1403, an image of the physical medium for printing the QR code is digitized to find a blank space larger than the minimum value of the code size decided in step 1402. In the embodiment of the present invention, the blank space means a square area in which the standard deviation of brightness value of the image is smaller than a certain value T1. If a blank space whose one side is larger than the minimum value of the code size decided in step 1402 is found, the processing proceeds to step 1405 to decide to print the QR code in the found area. In other words, in step 1404, if one or more square blank spaces whose one side E meets E=>D where D is the minimum code size (on condition that the blank space can be rotated), the processing proceeds from Yes of step 1404 to step 1405.

In the embodiment of the present invention, suppose that there are a plurality of printable blank spaces. If there are blank spaces that meet An=0 where An is the rotating angle of the QR code, a blank space whose one side E is the largest is selected as the printing location of the QR code. On the other hand, if there is no blank space that meets An=0, a blank space whose one side E is largest from among those having rotating angle An≠0 is selected as the printing location of the QR code. In either case, the offset (x, y) and the rotating angle An are output as parameters. After the processing step 1405 is executed, the processing proceeds to step 1408 to end the processing.

On the other hand, if no square blank space whose one side E meets E=>D is found in step 1404, the processing proceeds from No of step 1404 to step 1406. In step 1406, a digital image entirely printed in invisible ink on an image of a physical medium to be printed based on the condition used in step 1402.

After the digital image entirely printed in invisible ink is created, the processing proceeds to step 1407. In step 1407, an image is created by performing post-processing on the print image of the QR code (referred as to "I0: No Ink") and an image is created by performing post-processing on the image of the physical medium to be printed (referred as to "I1: With Ink"). In the embodiment of the present invention, the term "post-processing" means that the image is processed to reflect events likely to affect various images upon taking a picture of the QR code and extracting invisible information (for example, sampling depending on the number of pixels of the camera, image blur depending on paper properties, etc.). In the embodiment of the present invention, the image "I1: With Ink" has, on its top layer, a color the amount of which is largest as a component of the invisible ink (e.g., R, G, B, Y, Cb, or Cr) and the image "I0: No Ink" does not have the color on its top layer. Further, in step 1407, an average brightness value of a square having search step S as its one side length is calculated and held for each of the images "I0: No Ink" and "I1: With Ink." The processing proceeds to a flowchart of FIG. 15 via step 1408.

The flowchart 1500 of FIG. 15 starts at step 1501. In a step that follows step 1501, each of the images "I0: No Ink" and "I1: With Ink" is used to calculate the extraction accuracy of the invisible QR code while changing the size of the QR code and the rotating angle An. Instead of changing the size of the QR code and the rotating angle An, the extraction accuracy can also be calculated while changing the aspect ratio or the like of the QR code. However, for simplicity of illustration, the embodiment of the present invention assumes that the aspect ratio of the QR code is fixed.

The processing starts at step 1501, and in step 1502, the initial value of the rotating angle An is set to 0 deg. Next, in step 1503, the initial value of the QR code size Q is set to the maximum value of the code size, and the processing proceeds to step 1504. In step 1504, the location of the QR code where the invisible information meets the predetermined extraction accuracy condition is searched while shifting the QR code every search step S (every C=kS as a cell unit (black or white square) of QR code, where C is the size of one side and k is an integer equal to or greater than 1). The following describes the details of an example of a search algorithm in step 1504 with reference to a flowchart of FIG. 16.

FIG. 16 is a flowchart 1600 showing an example of the search algorithm in step 1504 of the flowchart of FIG. 15. The processing starts at step 1601, and in step 1602, the offset value (x, y) (upper-left end position) of the QR code to be shifted is initialized as (0, 0). Further, in step 1602, the initial value of Error_min representing the minimum error value is initialized as T (where T is the number of error correctable cells+1 in the QR code).

Next, in step 1603, an image of the QR code to be printed is generated using each of the images "I0: No Ink" and "I1: With Ink." Specifically, image portions to be printed (black portions of the QR code) are scanned in units of S×S from the image "I1: With Ink," image portions not to be printed (white portions of the QR code, i.e., outside the range of QR code) are scanned in units of S×S from the image "I0: No Ink," and both scanned images are combined to generate the image of the QR code. Further, in step 1603, position detection patterns 1701 contained in the QR code are searched using the image of the generated QR code. The position detection patterns 1701 are searched according to the following criteria: (1) they do not overlap each other, and (2) it is determined whether three position detection patterns can be detected on condition that the distance between the position detection patterns (for example, in case of two position detection patterns shown in FIG. 17, the distance between the right end of the left-hand position detection pattern and the left end of the right-hand position detection pattern) is twice or more the length of one side of the minimum position detection pattern (hereinafter referred as to "position detection pattern condition").

The following is an example of a method of determining whether three position detection patterns can be detected. First, it is assumed that the average brightness value of a position search code area to be detected is L, and the average brightness value of each S×S square to be searched and having the offset (x,y) is M(x,y). Then, f(x,y) is defined as follows:

$$f(x,y)=1 \text{ (if } M(x,y)<L)$$

$$f(x,y)=0 \text{ (otherwise)} \quad \text{(Equation 1)}$$

Next, if the length of consecutive f(x,y)=1 or f(x,y)=0 is N1, N2, N3, . . . , and the length takes on values that fall within allowable limits of error to which $\Delta_1$ and $\Delta_2$ are given. Then, if lengths that meet the following condition are found in horizontal and vertical directions, respectively, and three position detection patterns can be reproduced based on these lengths, it can be determined that three position detection patterns can be detected.

$$N1:N2:N3:N4:N5=1+\Delta_1:1+\Delta_1:3+\Delta_2:1+\Delta_1:1+\Delta_1 \quad \text{(Equation 2)}$$

If four or more patterns that meet the "position detection pattern condition" are found, any three patterns that meet the "position detection pattern condition" can be selected to repeat the following processing steps until the print position of the QR code is found. In this case, the following processing steps are repeated $_hC_3$ times at a maximum (where h is the number of patterns that meet the "position detection patterns condition"). Alternatively, if four or more patterns that meet the "position detection pattern condition" are found, pattern matching can be used to select three patterns that meet "position detection pattern condition and are close in shape to one another so that the selected three patterns will be processed in the following processing steps.

If three position detection patterns are detected, N1, N2, N3, N4, N5 values can be calculated (Equation 2) while shifting the horizontal component and the vertical component of each pattern little by little to determine the rotating angle An.

If three position detection patterns are found in step 1604, the processing proceeds from Yes of step 1604 to step 1605. In step 1605, the QR code area is defined based on the position detection patterns found in step 1604 and a bit conversion is performed. For example, when the rotating angle An is 0, the QR code area is defined as a square having the found position detection patterns as three corners. Further, if the average brightness value of an r×r square having the center point of each C×C cell at a position (s,t) as its center of gravity (where r<=C) is U(s,t,r) and the average brightness value of the QR code area is V, the bit conversion is performed based on a value g(s,t) defined in the following equation 3. Specifically, cells having a value g(s,t)=1 is defined as white and cells having a value g(s,t)=0 is defined as black to generate the QR code in order to achieve the bit conversion in step 1605.

$$g(s,t)=1 \text{ (if } U(s,t,r)<V)$$

$$g(s,t)=0 \text{ (otherwise)} \quad \text{(Equation 3)}$$

In the above description, V is the average brightness value of the overall QR code. However, since light and shade of a color in the QR code can vary, V can also be defined as a brightness average value V(s,t,Z) of a square having one side length Z and (s,t) as its center.

Next, in step 1606, errors in bit conversion are counted. Specifically, the QR code to be actually printed is compared with the QR code generated through the bit conversion to count the number of portions in which black pixels are turned white and vice versa (excluding the position detection, timing, and alignment patterns) as the number of errors. Next, in step 1607, it is determined whether the number of errors in bit conversion counted in step 1606 is 0. If it is determined in step 1607 that the number of errors is 0, the processing proceeds from Yes of step 1607 to step 1608, and the offset value obtained at the time is decided as the print location of the QR code.

If it is determined in step 1607 that the number of errors is not 0, the processing proceeds from No of step 1607 to step 1609 in which the number of errors obtained this time is compared as to whether it is smaller than the minimum value (Error_min) of the number of previous errors. If it is determined in step 1609 that the number of errors obtained this time is smaller than the minimum value of the number of previous errors, the processing proceeds from Yes of step 1609 to step 1610 in which the Error_min value is updated to the number of errors obtained this time and offset (xb,yb) is stored. After that, the processing proceeds to step 1611. If it is not determined in step 1609 that the number of errors obtained this time is smaller than the minimum value of the number of previous errors, the processing proceeds from No of step 1609 to step 1611 without updating the Error_min value to the number of errors obtained this time.

On the other hand, if three position detection patterns are not found in step 1604, the processing also proceeds from No of step 1604 to step 1611.

In the following steps, the above-mentioned sequence of operations are repeated while shifting the print position of the QR code by S each time in the x direction and the y direction, respectively, with a search range up to X in the x direction and Y in the y direction (steps 1611 through 1614). After performing these operations on the images, it is determined in step 1615 whether Error_min<T. If it is determined in step 1615 that Error_min<T, an offset to which the minimum error value is given is decided to be the print position of the QR code (step 1617). If it is not determined that Error_min<T, the processing is ended (step 1616).

In the above-mentioned processing, the image area L and the average brightness value V of the image need to be determined each time the print position is shifted by S in the x direction (or y direction). However, the image area L and the average brightness value V of the image before the print position is shifted by S can be so held that only differences from those before being shifted are added to the image area L and the average brightness value V of the image in order to speed up the processing.

The above has described an example of the search algorithm in step 1504 of the flowchart of FIG. 15 with reference to the flowchart of FIG. 16. Returning to FIG. 15, it is determined in step 1505 whether searching for the location of the QR code that meets the predetermined extraction accuracy of the invisible information in the search step 1504 is successful. If it is determined in step 1505 that the searching is successful, the processing proceeds from Yes of step 1505 to step 1506 in which the searched location is decided to be the print position of the QR code.

If it is determined in step 1505 that the searching cannot be done, these operations are performed while changing the size of the QR code and the rotating angle An until the print location can be searched (steps 1507 through 1510). When the print location cannot be ultimately searched even if the operations are repeated while changing the size of the QR code and the rotating angle An, it is determined that printing is impossible and the processing is ended (step 1511).

In the embodiment of the present invention, the scales of the size of the QR code and the rotating angle An to be changed in steps (QStep and AnStep) are specified by the editor. For example, if it is desired to perform high-speed processing, the editor can specify larger values relative to each other in QStep and AnStep. On the other hand, if it is desired to make it certain that the processing is correctly performed no matter how long it takes, the editor can specify smaller values relative to each other in QStep and AnStep. Note that if AnStep>=360, it means that the rotating angle An is not changed.

In the embodiment of the present invention, when Q takes a certain value, if at least one portion in which there is an error correctable offset (x,y) is found, the processing is ended. However, another algorithm as a modification for searching the minimum number of cells with respect to all sizes and all rotating angles An can also be employed.

As described above, according to the present invention, it is easily understood that print data capable of improving the extraction accuracy of the invisible information to be printed on the physical medium together with the visible information can be generated.

The above description has used the embodiment of the present invention, the present invention is not limited to the technical scope described in the embodiment. For example, the author's computer 11, the editor's computer 12, and the web server 13 are illustrated as single respectively in FIG. 1, but they can, of course, be plural respectively.

Further, the present invention can be embodied as hardware, software, or a combination of both. As a typical example of the combination of hardware and software, there can be cited a computer system having a predetermined program. In such a case, the predetermined program is loaded into the computer system and so executed that the program controls the computer system to cause the computer system to execute the processing according to the present invention. This program is configured from a set of instructions which can be expressed by an arbitrary language, code, or notation. Such an instruction set enables the system to perform a specific function directly or after (1) conversion to a different language, code, or notation, and/or (2) replication onto a different medium. Of course, the present invention encompasses not only such a program itself but also a medium on which the program is recorded. The program for performing the function of the present invention can be stored in any computer readable recording medium, such as a flexible disk, an MO, a CD-ROM, a DVD, a hard disk drive, a ROM, an MRAM, and a RAM. In order to store such a program onto the computer readable medium, the program can be downloaded from a different computer system connected via a communication line or can be replicated from a different recording medium. The program can also be compressed or divided into a plurality of components to store on a single recording medium or a plurality of recording media.

It is obvious to those skilled in the art that the above-mentioned embodiment can be changed or modified in various ways It should be understood that forms to which such changes and modifications are made can be included without departing from the technical scope of the present invention.

Figure 1:
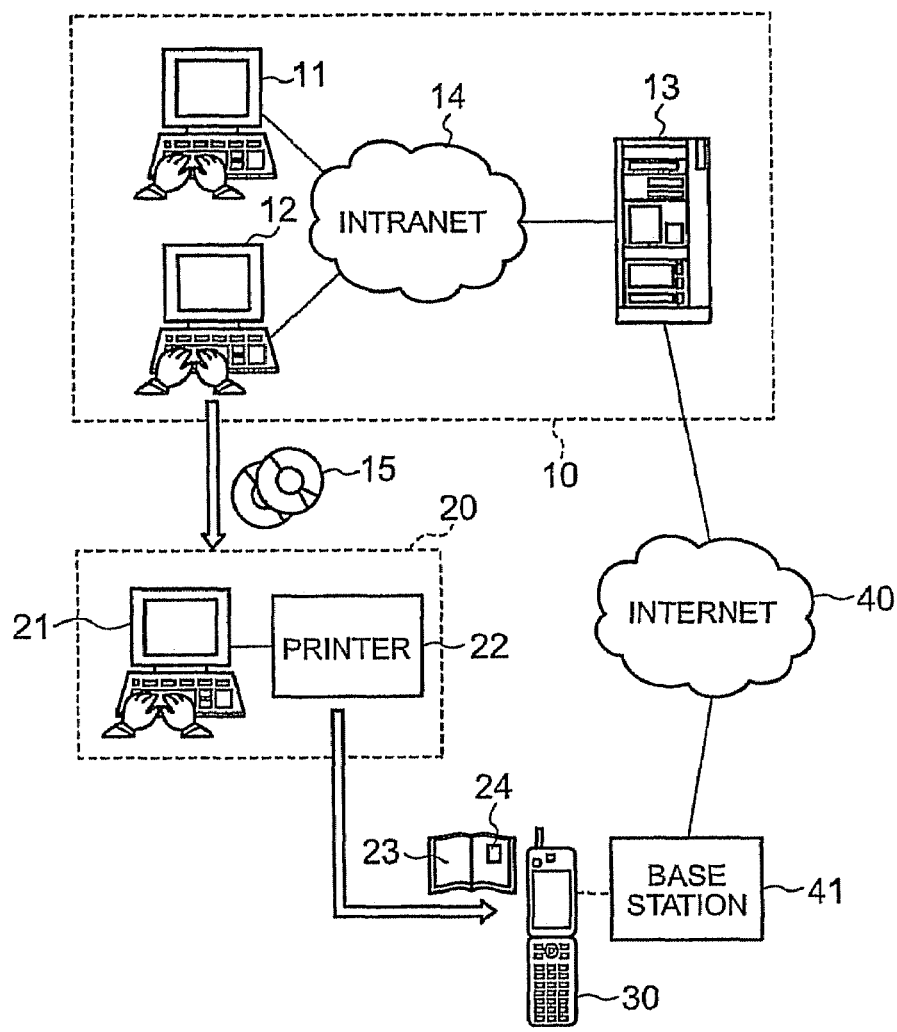
FIG. 1 It is a high level conceptual diagram of a preferred embodiment of the present invention.
Figure 2:
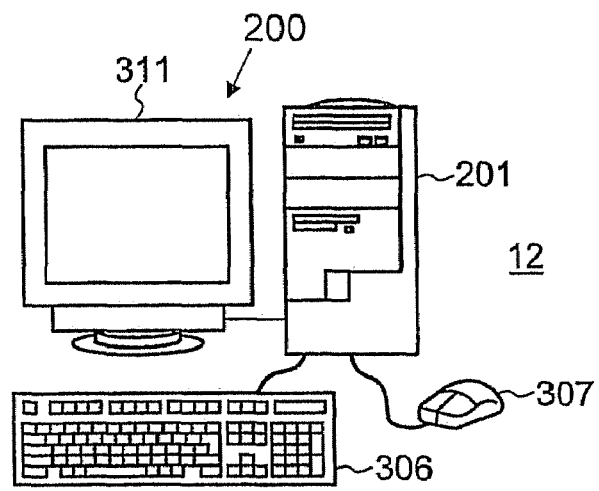
FIG. 2 It is an outline view showing an example of an information processing apparatus suitable for implementation of an author's computer, an editor's computer, a web server, or a computer of a printing company according to the embodiment of the present invention.
Figure 3:
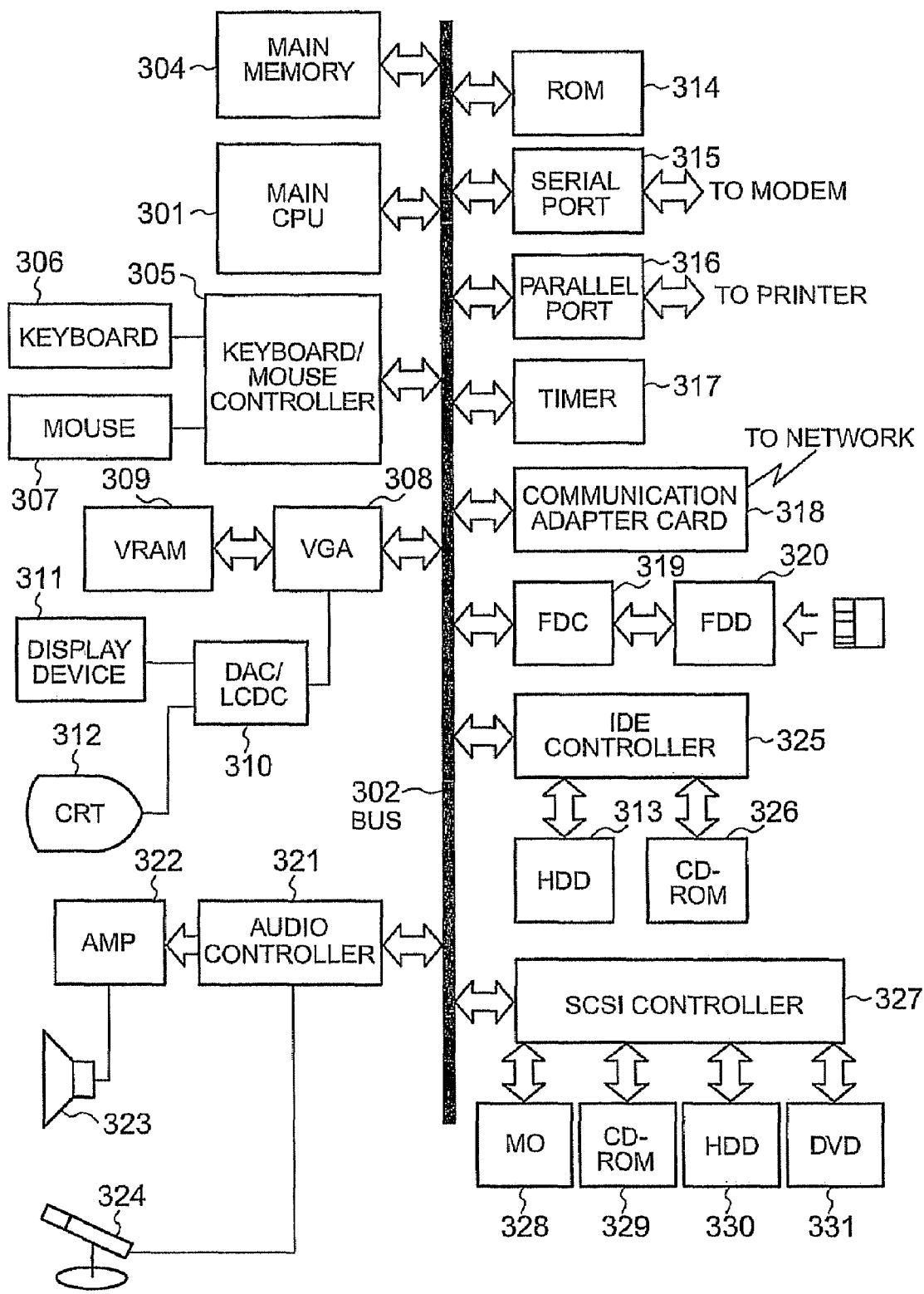
FIG. 3 It is a diagram showing an exemplary hardware configuration of the information processing apparatus suitable for implementation of the author's computer, the editor's computer, the web server, or the computer of the printing company according to the embodiment of the present invention.
Figure 4:
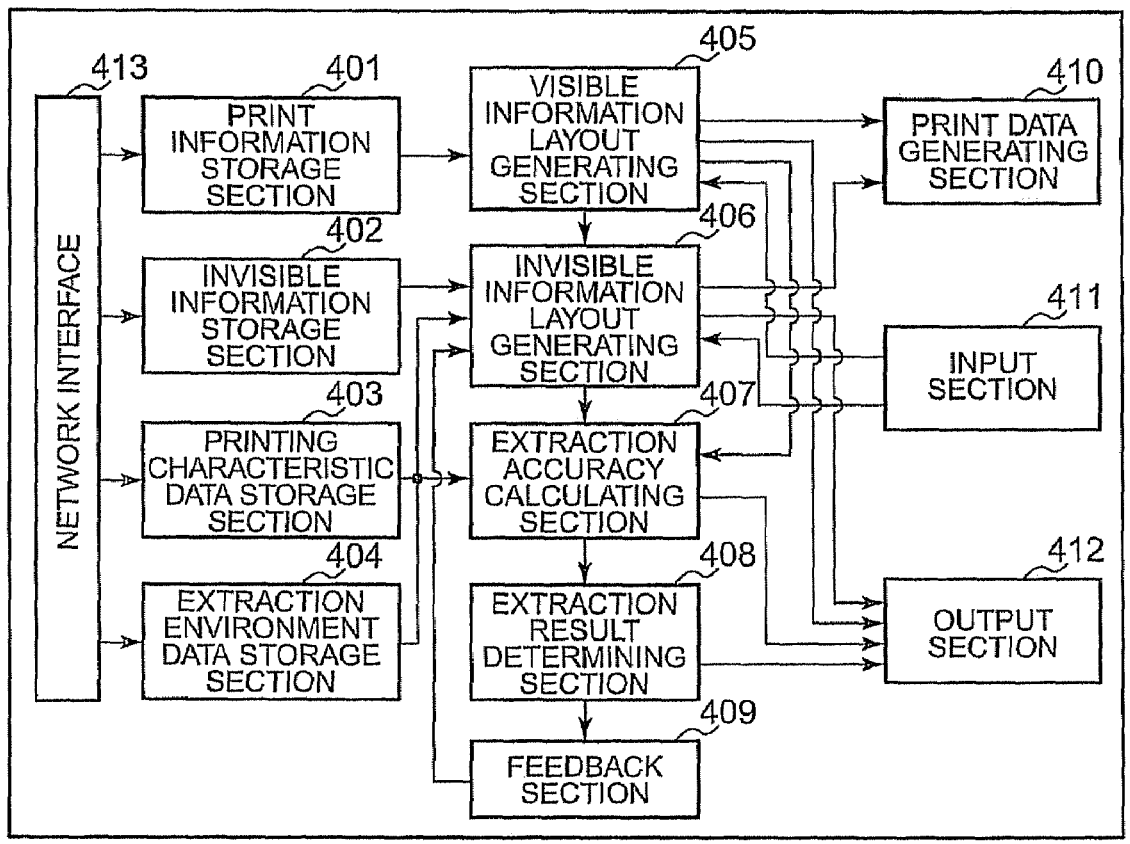
FIG. 4 It is a functional block diagram of the editor's computer according to the embodiment of the present invention.
Figure 5:
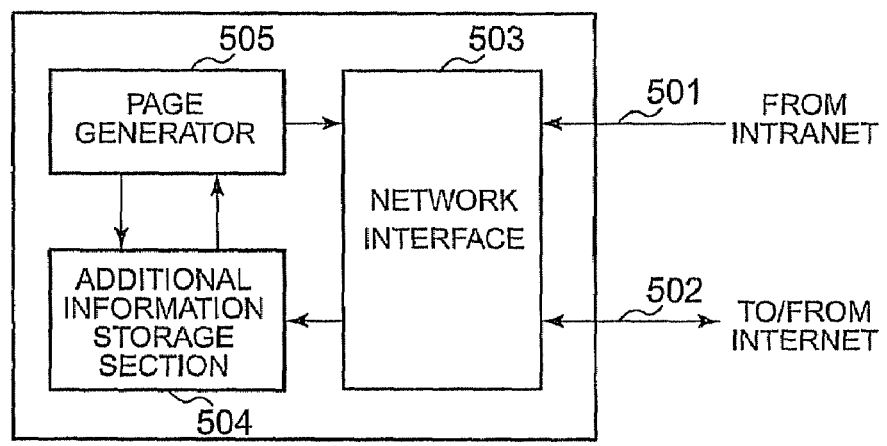
FIG. 5 It is a functional block diagram of the web server according to the embodiment of the present invention.
Figure 6:
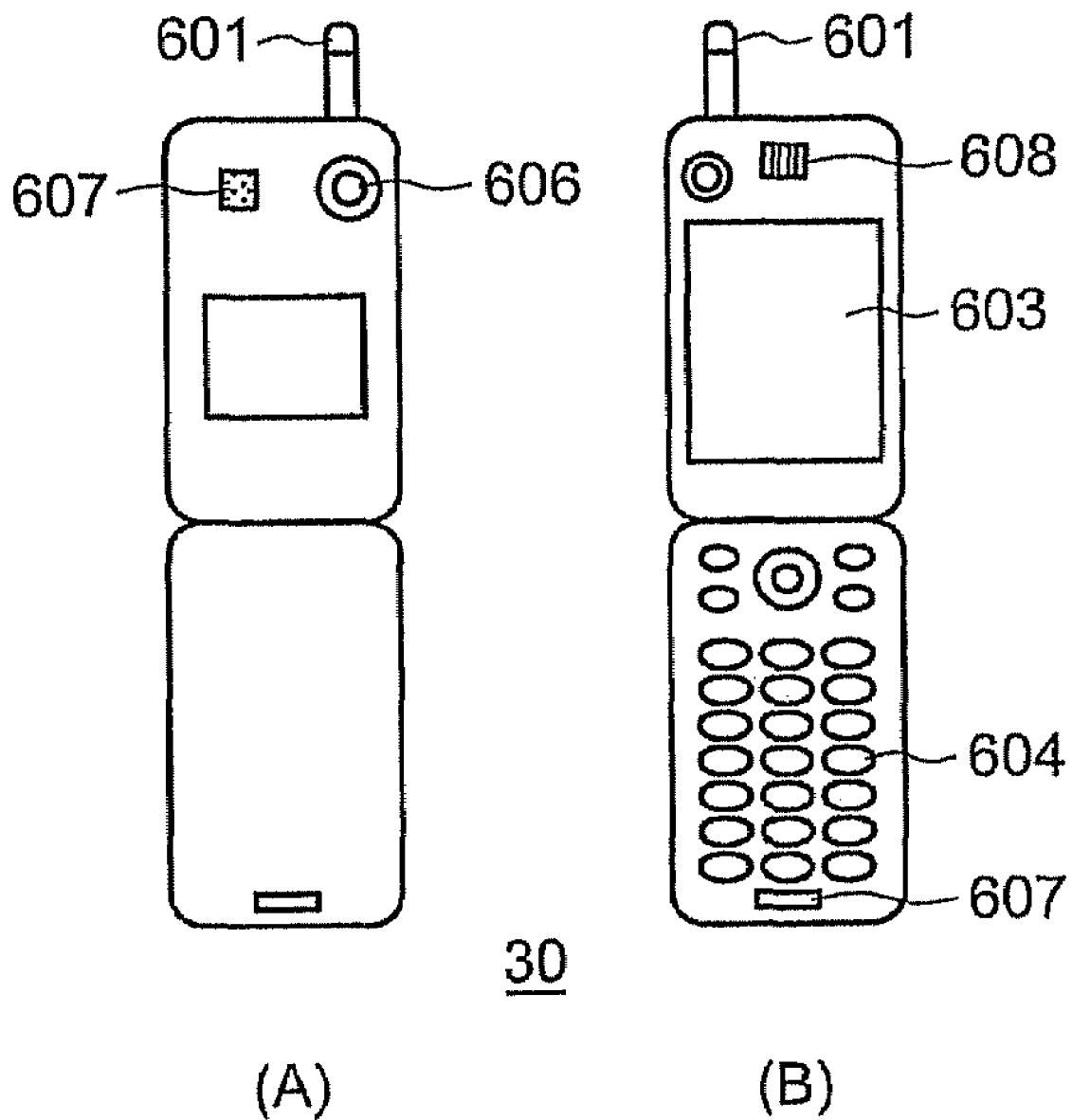
FIG. 6 It is an outline view of a cellular phone of a reader according to the embodiment of the present invention.
Figures 7, 8:
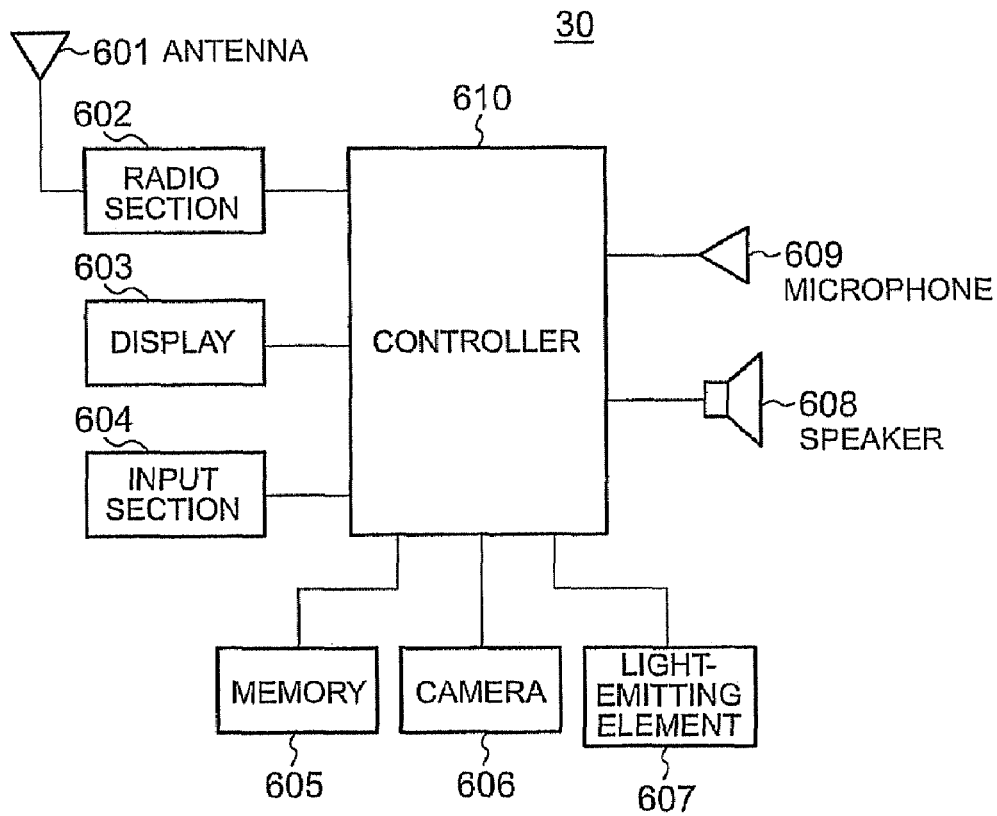
FIG. 7 It is a functional block diagram of the cellular phone of the reader according to the embodiment of the present invention.
FIG. 8 It shows an image example of a page of a book produced on a printer according to the embodiment of the present invention.
Figures 9, 10:
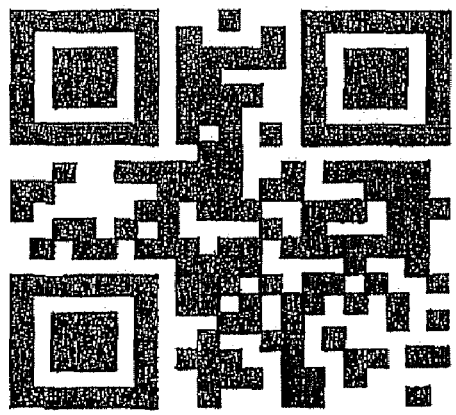
FIG. 9 It shows another image example of the page of the book produced on the printer according to the embodiment of the present invention.
FIG. 10 It shows an image example of a QR code printed on a page of the book produced on the printer according to the embodiment of the present invention.
Figure 11:
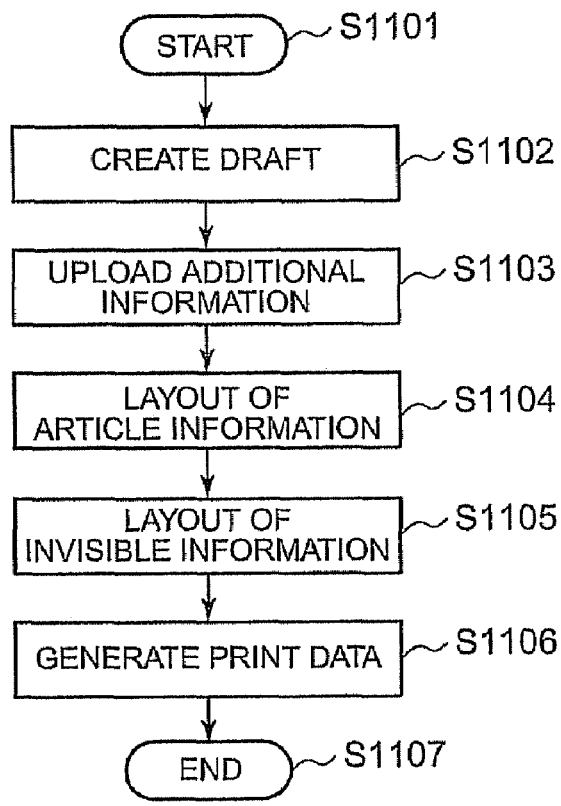
FIG. 11 It is a flowchart showing an outline of a flow of print data creation for a book according to the embodiment of the present invention.
Figure 12:
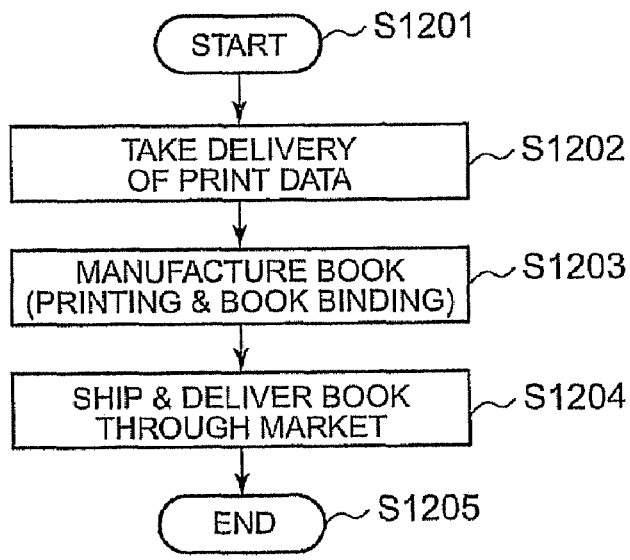
FIG. 12 It is a flowchart showing processing in an in-house system of the printing company which has received the print data according to the embodiment of the present invention.
Figure 13:
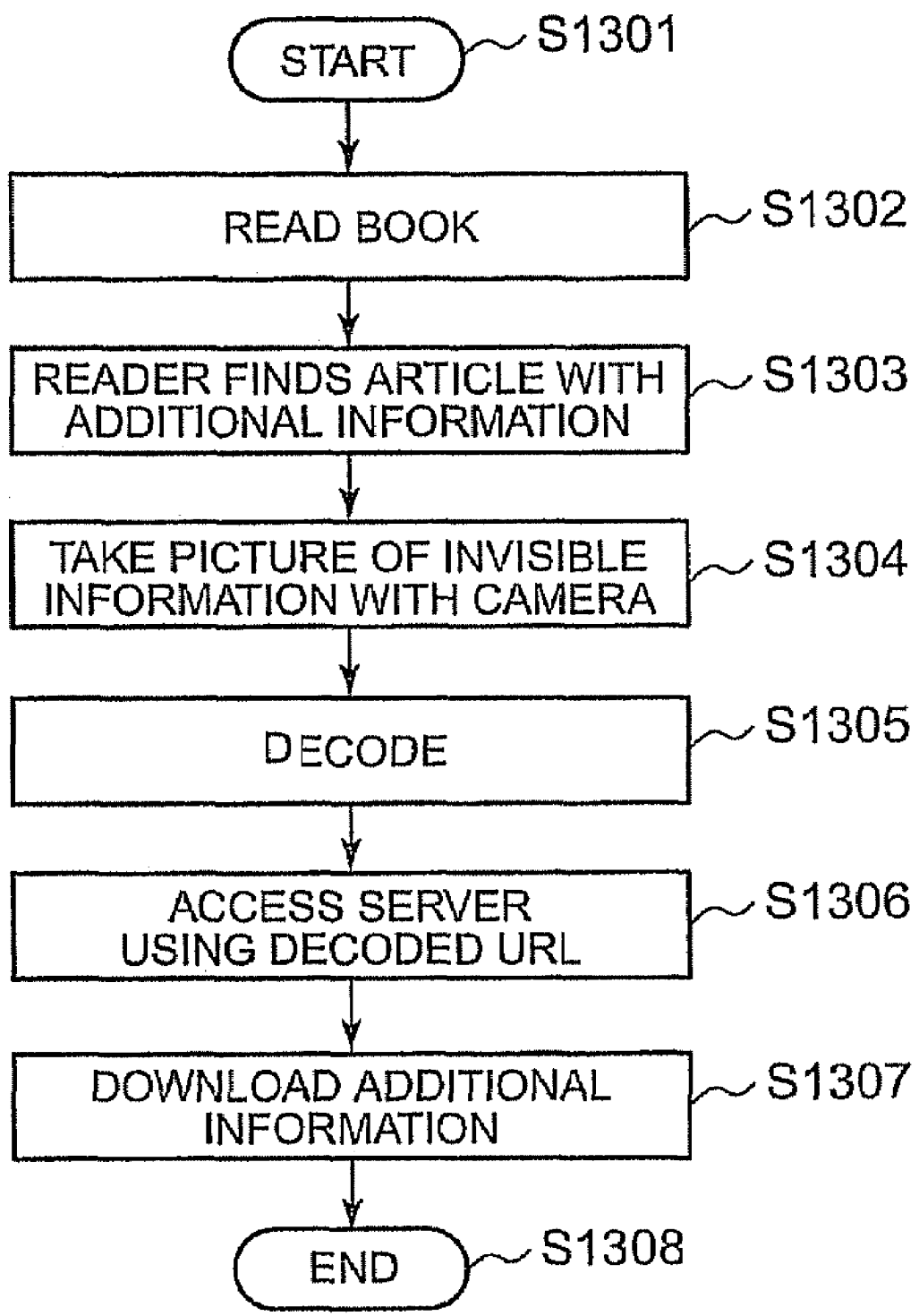
FIG. 13 It is a flowchart showing processing performed by the reader who has received the book in process of getting additional information of an article in the book according to the embodiment of the present invention.
Figure 14:
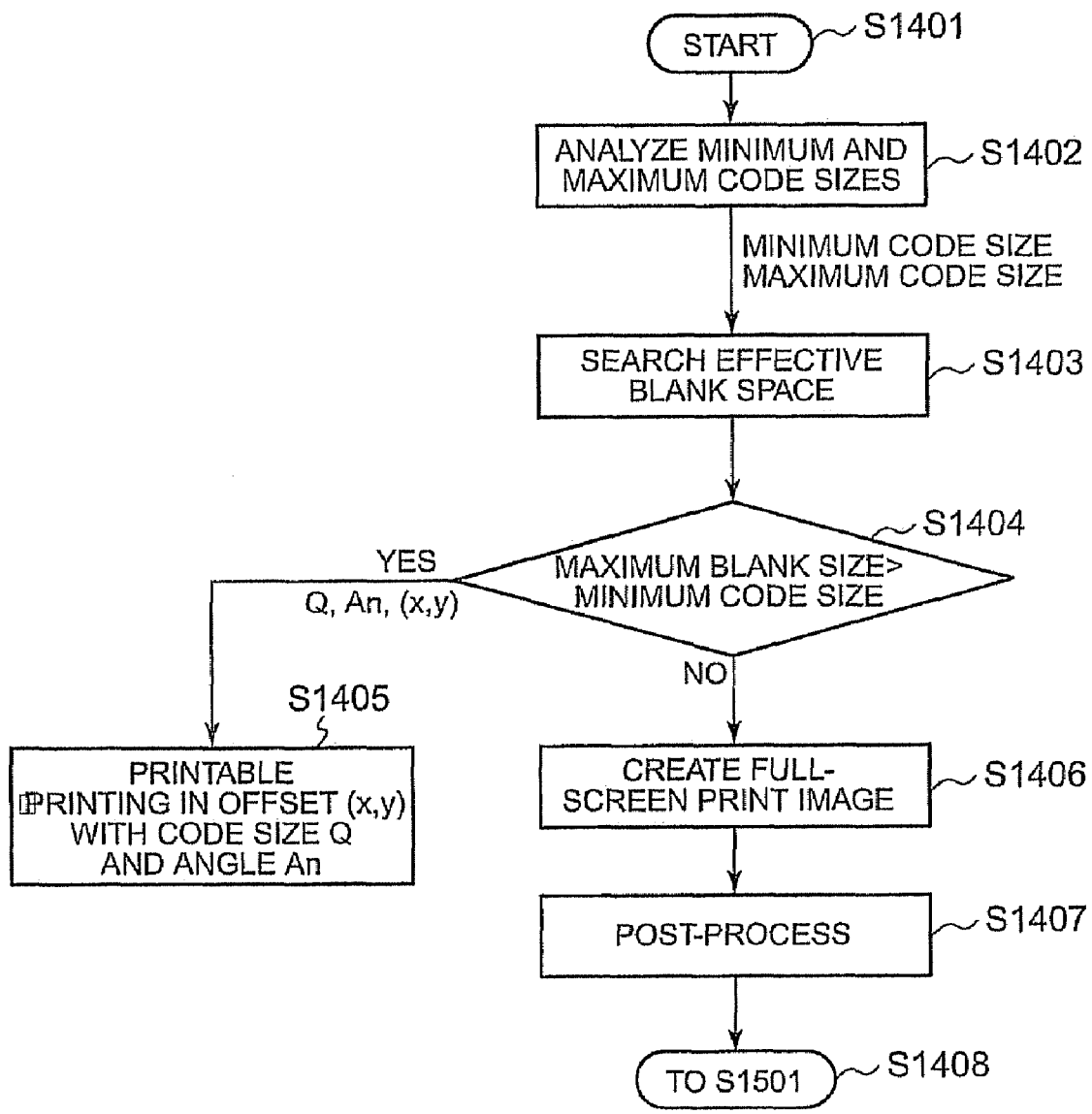
FIG. 14 It is a flowchart showing processing for print data creation of the QR code to be printed as invisible information according to the embodiment of the present invention.
Figure 15:
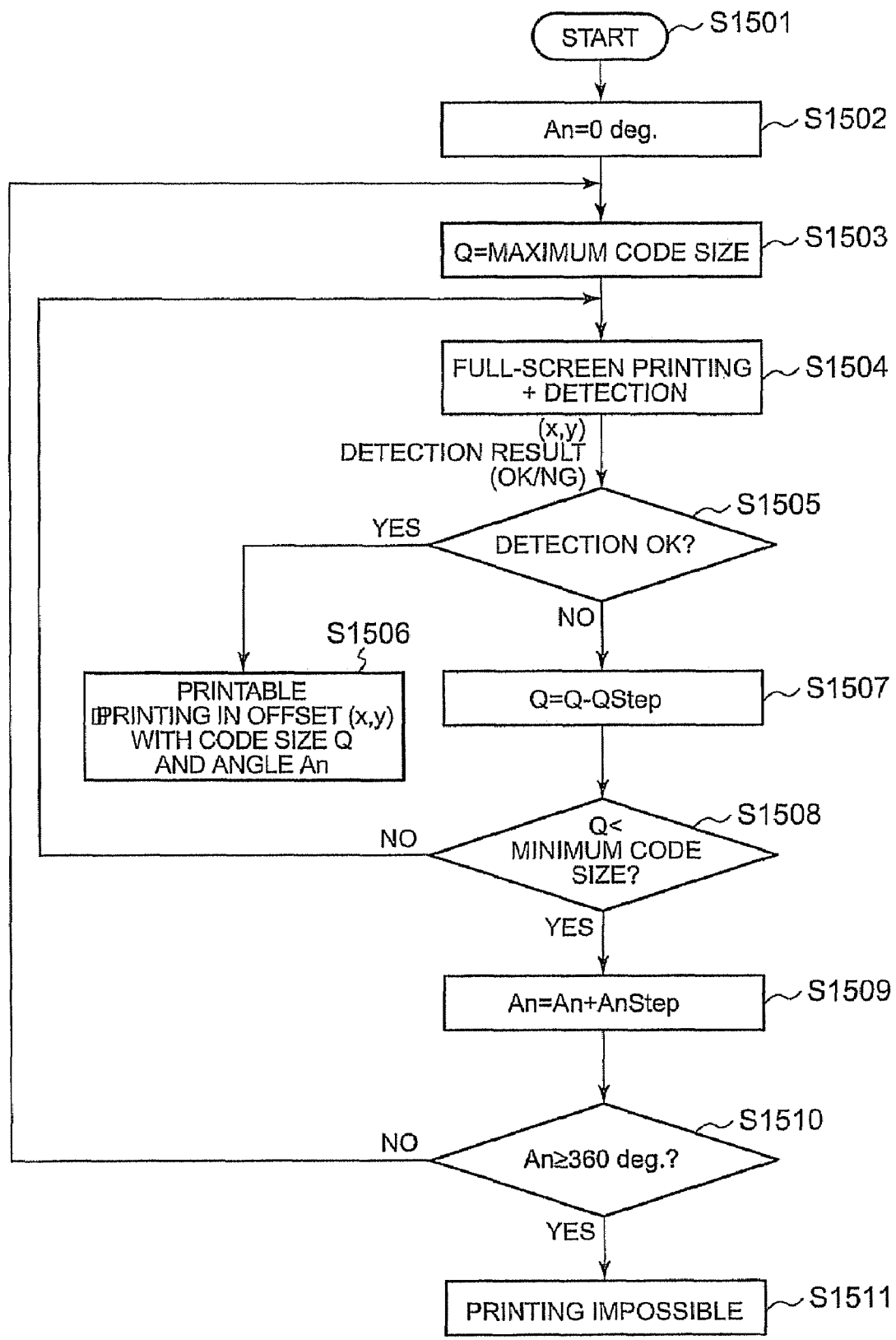
FIG. 15 It is a flowchart showing the processing for print data creation of the QR code to be printed as invisible information according to the embodiment of the present invention.
Figure 16:
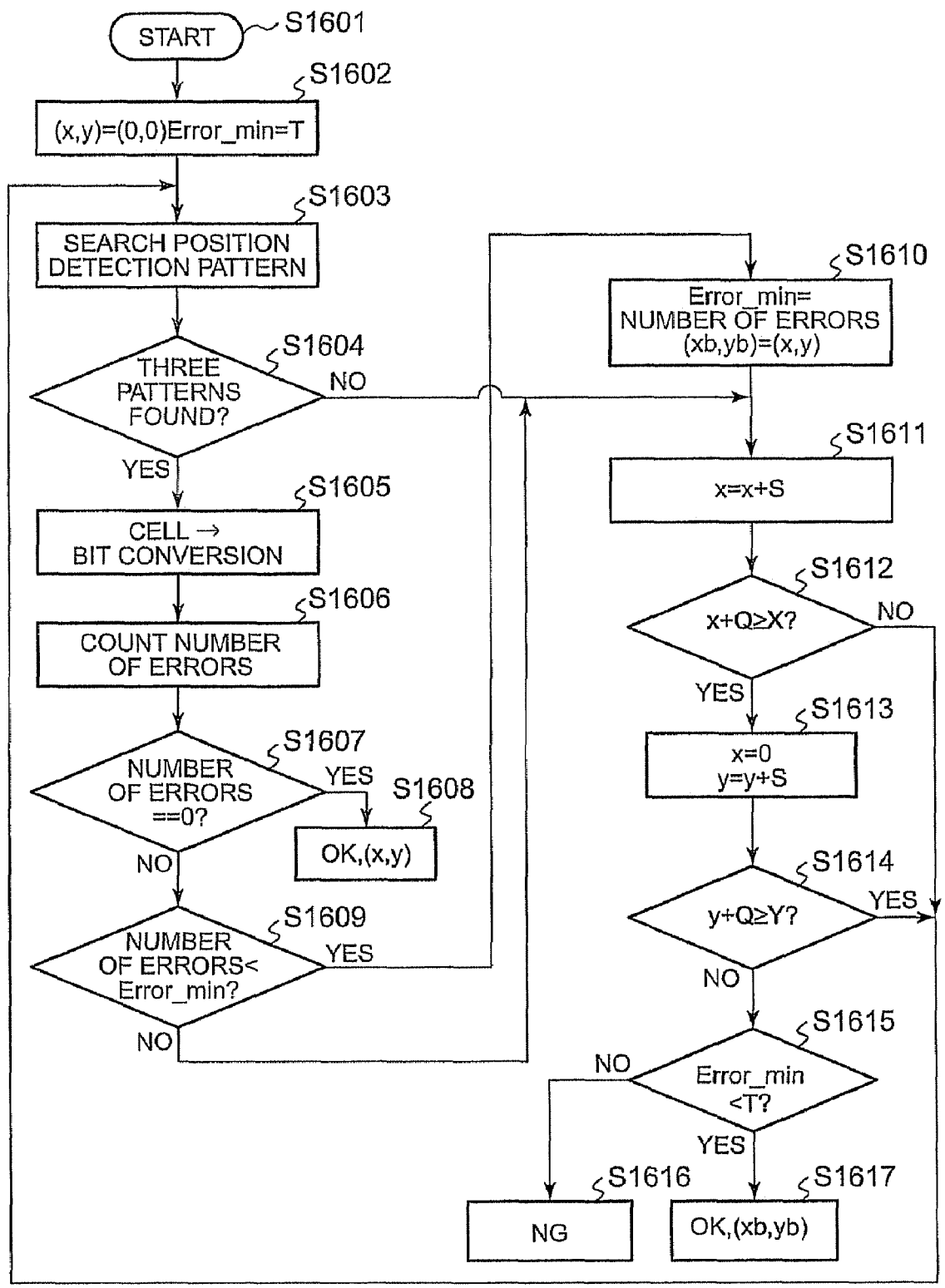
FIG. 16 It is a flowchart showing an example of an algorithm for searching the location of the QR code that the invisible information meets a predetermined extraction accuracy condition according to the embodiment of the present invention.
Figure 17:
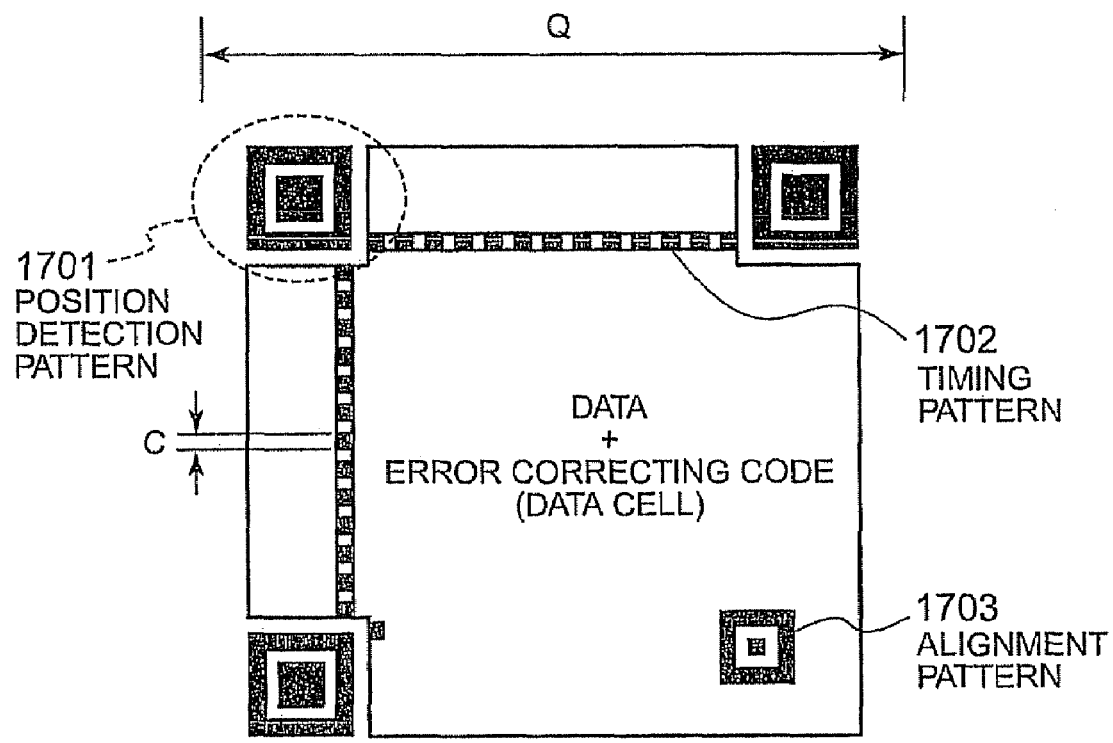
FIG. 17 It is an illustration showing an image of the QR code according to the embodiment of the present invention.
Figure 18:
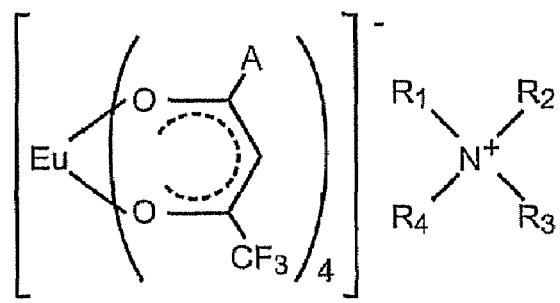
FIG. 18 It is an exemplary chemical formula of invisible ink in Background Art.

The invention claimed is:

1. A method of manufacturing a physical medium configured to store data, said method comprising:
    generating, by a processor of a computer system, a layout design of visible information to be printed with visible ink in a book, said visible information comprising an article;
    said processor generating a layout design of invisible information to be printed with invisible ink in a book, said invisible information comprising a Universal Resource Locator (URL) of an address of a web server at which additional information is located, said URL being encoded in a code within the invisible information, said additional information being associated with the article;

said processor generating print data of the visible information based on the generated layout design of visible information;

said processor generating print data of the invisible information based on the generated layout design of invisible information; and said processor storing, on the physical medium, the generated print data of the visible information and the generated print data of the invisible information.

2. The method of claim 1, wherein the code is a square characterized by a code size equal to the length of each side of the square, wherein said generating a layout design of invisible information comprises:

determining a square space in the physical medium in which to print the code, determining an offset that specifies the upper left corner of the square space in the physical medium; and determining an angle of rotation of the square space in the physical medium relative to a specified direction in the physical medium.

3. The method of claim 2, wherein said determining the square space comprises:

determining a minimum value of the code size; and finding a blank space have a square shape characterized by a length of each side of the square shape exceeding the minimum value of the code size, wherein the square space consists of the blank space.

4. The method of claim 3, wherein the determined angle of rotation is zero degrees.

5. The method of claim 3, wherein the determined angle of rotation exceeds zero degrees.

6. The method of claim 2, wherein said determining the square space, said determining the offset, and said determining the angle of rotation comprise:

determining a minimum value of the code size and a maximum value of the code size;

ascertaining that a blank space have a square shape characterized by a length of each side of the square shape exceeding the minimum value of the code size does not exist; and after said ascertaining, performing at least one step of a sequence of steps, wherein the sequence of steps is characterized by the code size being stepped from the maximum value of the code size to the minimum value of the code size, the offset being stepped on a surface of the physical tape, and the angle of rotation being stepped from 0 degrees to less than 360 degrees, wherein at each step of the at least one step the method determines whether an extraction accuracy for extracting the invisible information from an image of the code satisfies a predetermined condition, and wherein a last step of the at least one step is characterized by the method determining that the extraction accuracy satisfies the predetermined condition which results in the determined square space, the determined offset, and the determined angle of rotation consisting of the square space, the offset, and the angle of rotation of the last step.

7. The method of claim 6, wherein the determined angle of rotation is zero degrees.

8. The method of claim 6, wherein the determined angle of rotation exceeds zero degrees.

9. The method of claim 1, wherein the method further comprises:

after said generating the layout design of invisible information, said processor determining that an extraction accuracy for extracting the invisible information from an image of the code satisfies a predetermined condition, wherein said generating print data of the invisible information is responsive to said determining that the extraction accuracy satisfies the predetermined condition.

10. The method of claim 9, wherein said determining that the extraction accuracy satisfies the predetermined condition comprises:

simulating said extraction of the invisible information to calculate the extraction accuracy, wherein said simulating comprises utilizing the generated layout design of visible information and the generated layout design of invisible information; and assessing the calculated extraction accuracy, wherein said assessing comprises ascertaining whether the calculated extraction accuracy satisfies the predetermined condition and if said ascertaining ascertains that the calculated extraction accuracy does not satisfy the predetermined condition then performing an iterative loop, wherein each iteration of the loop comprises regenerating the layout design of invisible information followed by performing said simulating and said assessing, and wherein said loop is terminated upon ascertaining that the calculated extraction accuracy satisfies the predetermined condition.

11. The method of claim 1, wherein the code within the invisible information is a two-dimensional bar code.

12. A method for obtaining additional information associated with an article in a book, said method comprising:

emitting light of a specific wavelength in a manner that directs the light onto invisible information written in the book in invisible ink, said specific wavelength of light interacting with the invisible ink to illuminate the invisible information to become visible, said emitting being performed by a light-emitting element of a cellular phone, said invisible information comprising a Universal Resource Locator (URL) of an address of a web server at which the additional information is located, said URL being encoded in a code within the invisible information;

taking a picture, by a digital camera comprised by the cellular phone, of the illuminated invisible information to capture an image of the code into the cellular phone;

storing the captured image in a memory of the cellular phone;

decoding the code in the stored image to identify the URL, said decoding being performed by a processing function of the cellular phone; and downloading the additional information from the web server to a display of the cellular phone, said downloading being performed by an accessing function of the cellular phone to access the website through transmission of the decoded URL to a base station that couples the cellular phone to the web site via the Internet.

13. The method of claim 12, wherein the code within the invisible information is a two- dimensional bar code.

14. The method of claim 12, wherein the light-emitting element of the cellular phone is a light emitting diode (LED).

15. A cellular phone configured to be used by an operator, said cellular phone comprising:

a light-emitting element configured to emit light of a specific wavelength for illuminating invisible information in an object to make the invisible information visible, wherein the object is a book, and wherein the cellular phone is configured to perform a method for obtaining additional information associated with an article in the book through use of invisible information written in the book in invisible ink, wherein the light-emitting element is configured to emit the light of the specific wavelength in a manner that directs the light onto the invisible information written in the book in the invisible ink, said specific wavelength of light interacting with the invisible ink to illuminate the invisible information to become visible, said emitting being performed by the light-emitting element, said invisible information comprising a Universal Resource Locator (URL) of an address of a web server at which the additional information is located, said URL being encoded in a code within the invisible information, said URL being decoded by decoding the code in the stored image to identify the UR and downloading the additional information from the web server to a display of the cellular phone, said downloading being performed by an accessing function of the cellular phone to access the website through transmission of the decoded URL to a base station that couples the cellular phone to the web site via the Internet;

a digital camera configured to take a picture, of the illuminated invisible information to capture an image of the code; and a memory for storing the captured image in the memory of the cellular phone;

16. The cellular phone of claim 15, wherein the code within the invisible information is a two-dimensional bar code.

17. The cellular phone of claim 15, wherein the light-emitting element of the cellular phone is a light emitting diode (LED).

18. The cellular phone of claim 15, further comprising:

an antenna configured to receive an incoming radio wave transmitted from a base station;

a radio section configured to modulate the received radio wave into an electric signal;

a speaker configured to speak a voice sound derived from the electric signal;

a microphone configured to capture a voice sound from the operator for subsequent transmission to the base station.

19. The cellular phone of claim 18, further comprising:

a display configured to show the information to the operator, wherein the antenna is further configured to send a radio wave to a base station, and wherein the radio section is further configured to demodulate the electronic signal.

* * * * *